US012624492B2

(12) United States Patent
Lv et al.

(10) Patent No.: US 12,624,492 B2
(45) Date of Patent: May 12, 2026

(54) FILTERING DEVICE AND WASHING MACHINE

(71) Applicants:Qingdao Haier Washing Machine Co., Ltd., Shandong (CN); Haier Smart Home Co., Ltd., Shandong (CN)

(72) Inventors: Yanfen Lv, Shandong (CN); Sheng Xu, Shandong (CN)

(73) Assignees: QINGDAO HAIER WASHING MACHINE CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 89 days.

(21) Appl. No.: 18/701,539

(22) PCT Filed: Sep. 30, 2022

(86) PCT No.: PCT/CN2022/123102
§ 371 (c)(1),
(2) Date: Apr. 15, 2024

(87) PCT Pub. No.: WO2023/061247
PCT Pub. Date: Apr. 20, 2023

(65) Prior Publication Data
US 2024/0401260 A1      Dec. 5, 2024

(30) Foreign Application Priority Data

Oct. 13, 2021      (CN) ........................... 202111191360.0

(51) Int. Cl.
D06F 39/10          (2006.01)
B01D 33/073         (2006.01)
(Continued)

(52) U.S. Cl.
CPC ........... D06F 39/10 (2013.01); B01D 33/073 (2013.01); B01D 33/46 (2013.01); C02F 1/001 (2013.01);
(Continued)

(58) Field of Classification Search
CPC ....................................................... D06F 39/10
See application file for complete search history.

(56) References Cited

U.S. PATENT DOCUMENTS

2005/0120758 A1     6/2005   Thies et al.
2018/0142396 A1*    5/2018   Xu ........................... B01F 27/75
2022/0298695 A1*    9/2022   Lee .................... B01D 29/6469

FOREIGN PATENT DOCUMENTS

CN              2858620  Y      1/2007
CN            103422320  A     12/2013
(Continued)

OTHER PUBLICATIONS

CN109957947A Machine Translation (Year: 2019).*
(Continued)

*Primary Examiner* — Spencer E. Bell
(74) *Attorney, Agent, or Firm* — Panitch Schwarze Belisario & Nadel LLP

(57)          ABSTRACT

A filtering device and a washing machine. The filtering device includes: a filtering cavity, which has a water inlet, a filtered water outlet and a sewage outlet for discharging filtered impurities. A filtering mechanism is inside the filtering cavity, to filter the water entering the filtering cavity. A blocking mechanism separates the inside of the filtering cavity into a first space and a second space. The water inlet is communicated to the first space, and the filtered water outlet is connected to the first space. The cleaning particles are in the first space in the filtering cavity. The cleaning particles can prevent the deposition of filtered impurities
(Continued)

during the filtration process and avoid clogging of the filtering device. The blocking mechanism can prevent the cleaning particles from entering the second space, and from flowing out with the water flow from the filtered water outlet or the sewage outlet.

14 Claims, 4 Drawing Sheets

(51) Int. Cl.

| | | |
|---|---|---|
| *B01D 33/46* | (2006.01) | |
| *C02F 1/00* | (2023.01) | |
| *C02F 103/00* | (2006.01) | |
| *D06F 39/20* | (2024.01) | |

(52) U.S. Cl.

CPC .......... *D06F 39/20* (2024.01); *B01D 2201/34* (2013.01); *C02F 2103/002* (2013.01); *C02F 2201/004* (2013.01); *C02F 2303/16* (2013.01); *C02F 2307/12* (2013.01)

(56) References Cited

FOREIGN PATENT DOCUMENTS

| | | | |
|---|---|---|---|
| CN | 105019197 | A | 11/2015 |
| CN | 109957947 | A | 7/2019 |
| CN | 210177173 | U | 3/2020 |
| CN | 112386986 | A | 2/2021 |
| CN | 217266428 | U | 8/2022 |
| CN | 217266430 | U | 8/2022 |
| CN | 217266431 | U | 8/2022 |
| JP | 2018514307 | A | 6/2018 |

OTHER PUBLICATIONS

International Search Report and Written Opinion issued Dec. 15, 2022 in PCT/CN2022/123102.
English Translation of Office Action issued on Aug. 5, 2025, by the Japanese Patent Office in corresponding JP Application No. 2024-522197 (3 pages).
Extended European Search Report issued on May 19, 2025, by the European Patent Office in corresponding EP Application No. 22880186.6.

* cited by examiner

FILTERING DEVICE AND WASHING MACHINE

CROSS-REFERENCE TO RELATED APPLICATIONS

This application is a Section 371 of International Application No PCT/CN2022/123102, filed Sep. 30, 2022, which was published in the Chinese language on Apr. 20, 2023, under International Publication No. WO 2023/061247 A1, which claims priority under 35 U.S.C. § 119 (b) to Chinese Application No. 202111191360.0, filed Oct. 13, 2021, the disclosures of each of which are incorporated herein by reference.

TECHNICAL FIELD

The invention belongs to the technical field of washing machines, and specifically relates to a filtering device and a washing machine.

BACKGROUND

Existing washing machines are generally equipped with a filter for filtering lint. During the washing process, the washing water is circulated through the filter to remove the lint from the washing water to prevent the lint in the washing water from adhering to the surface of the washed clothes and affecting the performance of the clothes cleaning effect. However, the filter is usually installed inside the inner drum or drainage pump. After the washing machine is used for a long time, the inside of the filter will be filled with lint and debris, affecting the filtering effect of the filter. In severe cases, it may even block the drainage pump. At the same time, accumulated lint and other debris can easily breed bacteria and need to be cleaned in time, otherwise it will cause pollution of the washing water, cause secondary pollution to the clothes, and affect the health of users. However, most washing machines require users to remove the filter and clean it manually, which is inconvenient to operate.

On the other hand, in some filters, in order to prevent lint from clogging the filter holes on the filter, the pore size of the filter holes is usually set larger. However, this will also cause the fine lint on some clothes to not be filtered, causing this part of the lint to be blocked. The part of the lint stick to the clothes and affect the user experience. At the same time, some fine lint debris is drained away with the water flow and enters the ecological cycle, which will eventually affect human health.

Chinese patent application number 201310612183.8 discloses a filter and a washing machine. The filter includes a filter cylinder and a filter screen. The cylinder body is provided with a water inlet, a water outlet and a sewage outlet. The filter screen is installed inside the cylinder body, the inner cavity of the filter cylinder is divided into two parts: an internal cavity and an external cavity. The upper end of the internal cavity is connected to the water inlet, the lower end is connected to the sewage outlet, and the external cavity is connected to the water outlets are connected, and the sewage flows from the water inlet into the inner cavity. After being filtered by the filter screen, it enters the outer cavity and flows out through the water outlet. The filtered impurities are discharged from the sewage outlet.

In the above scheme, although the filter structure is set up so that the filtered impurities are less likely to hang on the filter and are easier to discharge, automatic cleaning of the filter cannot be fully realized, and the user still needs to clean it manually when necessary. On the other hand, the above solution can only perform autonomous cleaning before and after circulation filtration, and it is difficult to clean the inside of the filtering device during the circulation filtration process. When there are many impurities such as lint in the water, the filter may be covered during the filtration process, seriously affecting the filtration efficiency.

In view of this, the present invention is proposed.

SUMMARY

The technical problem to be solved by the present invention is to overcome the shortcomings of the existing technology and provide a filtering device and a washing machine. Cleaning particles are provided in the filtering cavity of the filtering device. During the filtering process, the friction between the cleaning particles and the inside of the filtering device can prevent filtered impurities from being deposited and ensure filtration efficiency. At the same time, a blocking mechanism is set up in the filtering cavity to prevent cleaning particles from entering the filtered water outlet and sewage outlet, preventing cleaning particles from being discharged from the filtering cavity with the water flow. It also prevents cleaning particles from clogging the filtered water outlet or sewage outlet.

In order to solve the above technical problems, the basic concept of the technical solution adopted by the present invention is:

A filtering device including:

a filtering cavity being provided with a water inlet, a filtered water outlet and a sewage outlet for discharging filtered impurities;

a filtering mechanism being rotatably installed inside the filtering cavity to filter water entering the filtering cavity;

wherein, the filtering device further includes:

a blocking mechanism, being provided inside the filtering cavity to divide the filtering cavity into a first space and a second space, the water inlet is communicated to the first space, and the filtered water outlet and sewage outlet are communicated to the second space;

cleaning particles, are arranged in the first space of the filtering cavity and are used to clean an inner wall of the filtering cavity and an outer wall of the filtering mechanism with friction and collision along with water flow.

Further, the blocking mechanism includes a blocking plate arranged inside the filtering cavity, and the first space and the second space are respectively formed on both sides of the blocking plate; a water passing structure is provided on the blocking plate or between the blocking plate and the inner wall of the filtering cavity for communicating the first space and the second space;

the water inlet and the cleaning particles are provided on a side of the blocking plate, and the filtered water outlet and the sewage outlet are provided on an other side of the blocking plate.

Further, the water passing structure is a plurality of water holes provided on the blocking plate; a width of the water holes is $D_1$, and a width of the cleaning particles is d, and $D_1 < d$;

alternatively, an outer peripheral part of the blocking plate is spaced apart from the inner wall of the filtering cavity, and the water passing structure is a gap between the blocking plate and the inner wall of the filtering cavity; a width of the gap is $D_2$, and the width of the cleaning particles is d, and $D_2 < d$.

Further, a density of the cleaning particles is less than that of water;

preferably, the density of the cleaning particles is 0.3 to 0.9 times the density of water, preferably 0.4 to 0.6 times;

preferably, the water inlet is provided in an upper area of the filtering cavity, and a diameter of the water inlet is smaller than the width d of the cleaning particles.

Further, an outer circumference of the filtered water outlet extends toward outside of the filtering cavity to form a sealing support part;

the filtering mechanism includes:

a filtering part, being provided on the same side of the blocking plate as the water inlet and filters the water entering the first space;

a water outlet joint, one end of which is connected to the filtering part, an other end passes through the blocking plate, and is rotatably inserted into the sealing support part;

preferably, a bearing is set on the water outlet joint; a seal is provided on a side of the bearing facing inside of the filtering cavity, and the seal blocks the gap between the water outlet joint and the sealing support part.

Further, the blocking plate is provided with a through hole for the water outlet joint to pass through, and the through hole fits with an outer wall of the water outlet joint with a clearance.

Further, directions of the water inlet and the sewage outlet are perpendicular to an axial direction of the filtering mechanism;

preferably, the filtering cavity has a columnar structure, the filtered water outlet is disposed on an end surface of one end of the filtering cavity, the sewage outlet is disposed near one end of the filtered water outlet, and the water inlet is disposed near an other end of the filtering cavity.

Another object of the present invention is to provide a washing machine, including:

a water tank;

a circulating filter pipeline, a water inlet end and a water outlet end of the circulating filter pipeline are respectively connected with the water tank, and the above-mentioned filtering device is arranged on it.

Further, it also includes a recovery device connected to the sewage outlet for collecting the filtered impurities discharged;

preferably, the sewage outlet and the recovery device are connected through a sewage pipeline, and a sewage control valve for controlling opening and closing of the sewage pipeline is provided on the sewage pipeline.

Further, the recovery device includes:

a housing, being provided with a recovery chamber inside;

a filter component, being arranged in the recovery chamber and divides the recovery chamber into a first chamber and a second chamber;

the sewage outlet is communicated to the first chamber, and sewage carrying the filtered impurities enters the first chamber, and enters the second chamber after being filtered by the filter component, and the filtered impurities are collected in the first chamber;

preferably, the second chamber is provided with a water outlet for discharging filtered clean water;

preferably, the washing machine further includes a box body, the water tank and the filtering device are both disposed in the box body; the housing is insertable/extractable and is disposed on the box body.

After adopting the above technical solution, the present invention has the following beneficial effects compared with the prior art.

In the present invention, cleaning particles are provided in the filtering cavity. The cleaning particles can be driven by the water flow during the filtration process and continuously rub and collide with the inner wall of the filtering cavity and the outer wall of the filtering mechanism, thereby achieving a cleaning effect, preventing the deposition of filtered impurities, and avoiding the impact of clogging on the filtration efficiency of the filtering device. At the same time, the blocking mechanism blocks the cleaning particles in the first space, so that the cleaning particles cannot enter the second space with the water flow, and will not be discharged from the filtered water outlet, or cause the filtered water outlet to be blocked, affecting the outflow of filtered water. After the filtration is completed, the filtered impurities accumulated during the filtration process can be discharged through the sewage outlet with the water, but the cleaning particles will not be discharged from the sewage outlet with the water due to the existence of the blocking mechanism. This can also prevent the sewage outlet from being blocked by cleaning particles during the sewage discharge process.

In the present invention, a blocking plate is provided in the filtering cavity as a blocking mechanism, and a water hole is provided on the blocking plate, or a gap is provided between the blocking plate and the inner wall of the filtering cavity to allow the water flow to pass through, and the cleaning particles can be blocked by the blocking plate. The barrier cannot pass through and the structure is simple, achieving effective blocking of cleaning particles. The density of the cleaning particles is smaller than the density of water, which is more conducive to the movement of the cleaning particles in the filtering cavity driven by the water flow, preventing the cleaning particles from being deposited at the bottom of the filtering cavity and ineffective cleaning effect.

In the present invention, by driving the water in the water tank to circulate along the circulation filtration pipeline, it can continuously pass through the filtering device on the circulation filtration pipeline to remove filtered impurities such as lint in the water, thereby reducing the lint content in the water in the water tank, improve laundry performance. The recovery device is connected to the sewage outlet of the filtering cavity and can receive the sewage carrying filtered impurities discharged by the filtering device, preventing the filtered impurities from directly flowing into the drainage water of the washing machine and being discharged outward, causing the fine lint in it to enter the ecological cycle and harm the human body.

In the present invention, a filter component is provided in the recovery device to filter the sewage entering the recovery chamber, thereby separating the filtered impurities from the water and avoiding the situation where the filtered impurities and water are mixed together and are difficult to process. At the same time, the filtered clean water can be directed into the water tank for reuse, or into the drainage pipe for discharge, without causing fine lint to affect the ecological environment.

Specific embodiments of the present invention will be described in further detail below with reference to the accompanying drawings.

BRIEF DESCRIPTION OF THE DRAWINGS

The drawings, as part of the present invention, are used to provide a further understanding of the present invention. The schematic embodiments of the present invention and their descriptions are used to explain the present invention, but do not constitute an improper limitation of the present invention. Obviously, the drawings in the following description are only some embodiments. For those of ordinary skill in the art, other drawings can be obtained based on these drawings without exerting creative efforts. In the attached drawings.

Figure 1:
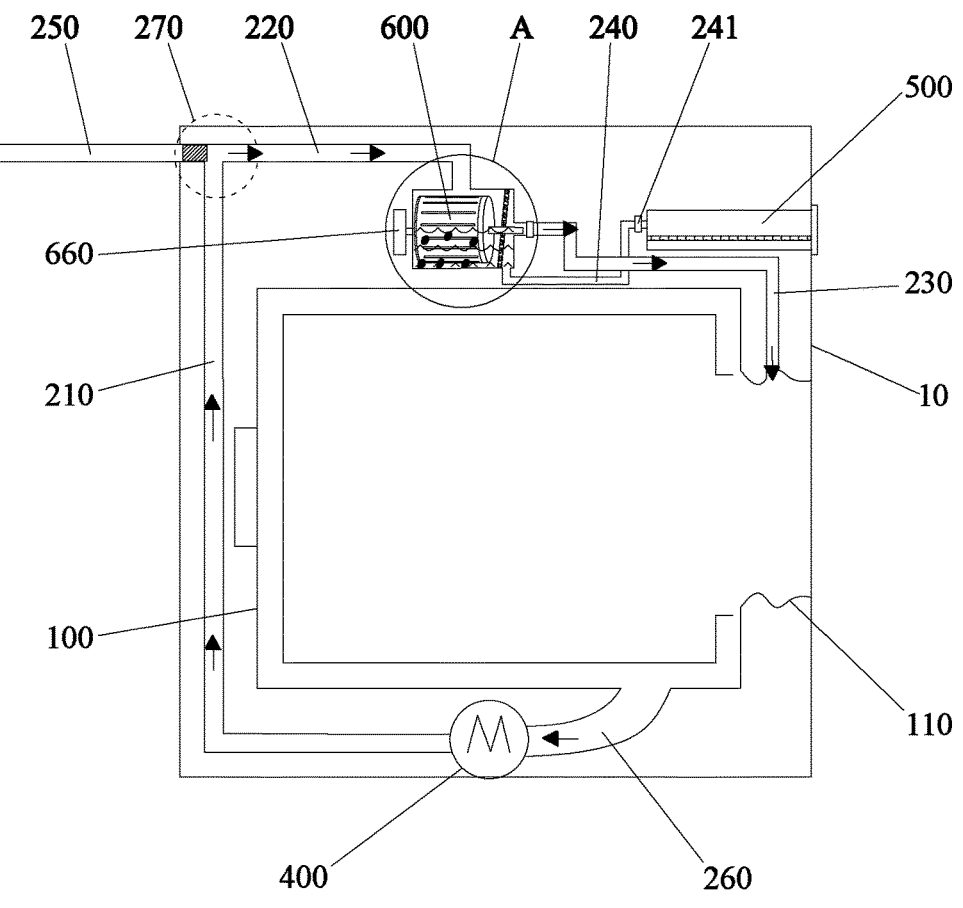
FIG. 1 is a schematic diagram of a filtering device installed in a washing machine according to Embodiment 1 of the present invention.

In the picture: 10. box body; 100. water tank; 110. window gasket; 210. drainage pipeline; 220. circulation pipeline; 230. return water pipeline; 231. return water control valve; 240. sewage pipeline; 241. sewage control valve; 250. discharge pipeline; 260. water tank drainage pipe; 270. switching device; 400. circulation pump; 500. recovery device; 501. filtered impurities; 510. housing; 520. filter component; 531. first chamber; 532. second chamber;

600. filtering device; 601. first limiting surface; 602. second limiting surface; 603. third limiting surface; 604. fourth limiting surface; 605. fifth limiting surface; 606. sixth limiting surface; 610. filtering cavity; 6101. water inlet; 6102. filtered water outlet; 6103. sewage outlet; 6104. installation opening; 611. sealing support part; 612. sleeve part; 613. reinforcing rib; 620. filtering mechanism; 621. water outlet joint; 622. rotating support part; 623. filter support part; 624. motor mounting part; 625. filter screen; 631. first bearing; 632. second bearing; 641. first seal; 642. second seal; 643. third seal; 650. filtering cavity flange; 651. connection part; 652. insertion part; 653. through port; 660. driving mechanism; 680. cleaning particles; 690. blocking plate; 691. water hole; 692. through hole.

It should be noted that these drawings and text descriptions are not intended to limit the scope of the present invention in any way, but are intended to illustrate the concept of the present invention for those skilled in the art by referring to specific embodiments.

DETAILED DESCRIPTION

In order to make the purpose, technical solutions and advantages of the embodiments of the present invention clearer, the technical solutions in the embodiments of the present invention will be clearly and completely described below in conjunction with the drawings in the embodiments of the present invention. The following examples are used to illustrate the present invention, but are not used to limit the scope of the present invention.

In the description of the present invention, it should be noted that the terms "upper", "lower", "left", "right", "vertical", "inner", "outer", etc. indicate an orientation or positional relationship based on the orientation or positional relationship shown in the drawings is only to facilitate the description of the present invention and simplify the description, and does not indicate or imply that the device or element referred to must have a specific orientation, be constructed and operated in a specific orientation, and therefore cannot be understood as limitations on the invention.

In the description of the present invention, it should be noted that, unless otherwise clearly stated and limited, the terms "installation" and "connection" should be understood in a broad sense. For example, it can be a fixed connection, a detachable connection, or an integral connection; it can be directly connected or indirectly connected through an intermediary. For those of ordinary skill in the art, the specific meanings of the above terms in the present invention can be understood on a case-by-case basis.

Embodiment 1

As shown in FIGS. 1 to 6, this embodiment provides a filtering device 600, including: a filtering cavity 610 has a water inlet 6101, a filtered water outlet 6102, and a sewage outlet 6103 that discharges filtered impurities 501 outward;

a filtering mechanism 620 is rotatably arranged inside the filtering cavity 610 to filter the water entering the filtering cavity 610;

a blocking mechanism is arranged inside the filtering cavity 610 to separate the inside of the filtering cavity 610 into a first space and a second space. The water inlet 6101 is communicated to the first space, and the filtered water outlet 6102 and the sewage outlet 6103 are communicated to the second space;

cleaning particles 680 are disposed in the first space in the filtering cavity 610 and are used to clean the inner wall of the filtering cavity 610 and the outer wall of the filtering mechanism 620 by friction and collision with the water flow.

The filtering device 600 of this embodiment can be installed in washing equipment, including but not limited to washing machines, care machines, dishwashers, etc., for filtering and removing lint carried in washing water. This embodiment is described with reference to FIGS. 1 to 6, taking the filtering device 600 installed in a washing machine as an example.

Specifically, the filtering mechanism 620 divides the interior of the filtering cavity 610 into an outer chamber and an inner chamber. The water inlet 6101 on the filtering cavity 610 is communicated with the outer chamber. The water to be filtered in the water tank 100 of the washing machine is transported to the water inlet 6101 and then enters the outer chamber inside the filtering cavity 610. The water in the outer chamber is filtered by the filtering mechanism 620 and then enters the inner chamber, and then flows out through the filtered water outlet 6102 connected to the inner chamber. The filtered impurities 501 in the water cannot pass through the filtering mechanism 620 and remain in the outer chamber.

The blocking mechanism divides the interior of the filtering cavity 610 into a first space on the left and a second space on the right. The main body of the filtering mechanism 620 is located in the first space. During the filtration process, the cleaning particles 680 are between the filtering cavity 610 and the filtering mechanism 620 in the first space. The flowing water continuously rubs the inner wall of the filtering cavity 610 and the outer wall of the filtering mechanism 620, causing the attached filtered impurities 501 to fall off. This prevents the deposition of filtered impurities 501 and prevents the filtering mechanism 620 from being covered by the filtered impurities 501 and affecting the filtration efficiency. On the other hand, it also avoids the problem that the filtered impurities 501 attached after the filtration is too thick and adheres too firmly to the inner wall of the filtering cavity 610 or the outer wall of the filtering mechanism 620, making it difficult to remove the filtered impurities 501 when cleaning the filtering device 600 later. At the same time, the setting of the blocking mechanism prevents the cleaning particles 680 from entering the second space, thereby preventing the cleaning particles 680 from being discharged with the water flow through the filtered water outlet 6102 or accumulating in the filtered water outlet 6102 to cause blockage.

The filtering mechanism 620 is connected to a driving mechanism 660, such as a motor, for driving the filtering mechanism 620 to rotate in the filtering cavity 610. When it is necessary to clean the filtering device 600, the driving mechanism 660 drives the filtering mechanism 620 to rotate, stirring the water in the filtering cavity 610, so that the filtered impurities 501 on the outer wall of the filtering mechanism 620 are removed from the outer wall of the filtering mechanism 620 under the action of centrifugal force and agitated water flow. It is peeled off, melted into the water in the filtering cavity 610, and then discharged from the filtering cavity 610 through the sewage outlet 6103. In this way, automatic cleaning of the filtering device 600 is realized, without manual operation by the user, and is easy to use.

During the above process, the cleaning particles 680 move in the filtering cavity 610 with the action of the turbulent water flow, and rub against the inner wall of the filtering cavity 610 and the outer wall of the filtering mechanism 620, thereby improving the peeling efficiency of the filtered impurities 501 and better self-cleaning of the filtering device 600. When the filtered impurities 501 are discharged outward, the water flow can be discharged from the sewage outlet 6103 through the blocking mechanism. The cleaning particles 680 are blocked by the blocking mechanism and stay in the first space on the left side, preventing the cleaning particles 680 from being discharged with the water flow through the sewage outlet 6103 or the sewage outlet being blocked, affecting the efficiency of sewage discharge.

In this embodiment, the shape of the cleaning particles 680 includes but is not limited to spherical, ellipsoidal, elliptical cylindrical, etc. shapes. The surface of the cleaning particles 680 may be a smooth surface or a non-smooth surface. It is preferable that the cleaning particles 680 have a non-smooth surface, which can increase the friction between the cleaning particles 680 and the inner wall of the filtering cavity 610 and the outer wall of the filtering mechanism 620, and have a better effect of peeling off the filtered impurities 501.

The material of the cleaning particles 680 is preferably a wear-resistant elastic material to prevent the cleaning particles 680 from being easily worn during use. The resilience of the cleaning particles 680 is preferably 0% to 50%. The cleaning particles 680 are made of elastic materials that are easily deformed when stressed, which can prevent the cleaning particles 680 from getting stuck during the rotation of the filtering mechanism 620 and even causing the filtering device to 600 damage.

More preferably, the cleaning particles 680 are made of wear-resistant elastic antibacterial materials, for example, adding antibacterial components such as copper ions and silver ions thereto, which can also play a certain sterilizing effect on the filtered water during the filtration process.

In a further solution of this embodiment, the blocking mechanism includes a blocking plate 690 disposed inside the filtering cavity 610, and the first space and the second space are respectively formed on the left and right sides of the blocking plate 690. The blocking plate 690 has a water passing structure for connecting the first space and the second space.

The water inlet 6101 and the cleaning particles 680 are located on the left side of the blocking plate 690, and the filtered water outlet 6102 and the sewage outlet 6103 are located on the right side of the blocking plate 690.

Further, the outer periphery of the blocking plate 690 is arranged to fit or nearly fit to the inner wall of the filtering cavity 610, and the water passing structures are a plurality of water holes 691 provided on the blocking plate 690. The width of the water hole 691 is $D_1$, the width of the cleaning particles 680 is d, and $D_1 < d$.

The water hole 691 in this embodiment is a circular hole, and the width $D_1$ of the water hole 691 is the diameter of the water hole 691. It can be understood that the water hole 691 can also be arranged in other shapes, such as square holes, strip holes, etc., in which case the minimum size of the water hole 691 in different directions is the width $D_1$.

Similarly, for spherical cleaning particles 680, the width d of the cleaning particles 680 is the diameter of the cleaning particles 680. For cleaning particles 680 of other shapes, since the sizes of the cleaning particles 680 in different directions are not exactly the same, the smallest size among multiple different sizes is the width d. This ensures that the cleaning particles 680 cannot pass through the water holes 691 on the blocking plate 690 no matter how they change directions, thereby ensuring that the blocking plate 690 effectively blocks the cleaning particles 680.

In the above solution, the blocking plate 690 provided with the water hole 691 serves as a blocking mechanism, so that the water flow and the wire debris it carries can easily pass through, but the cleaning particles 680 can be effectively blocked by the blocking plate 690. The structure is simple and easy to implement.

In the preferred solution of this embodiment, a raised positioning structure is provided on the inner wall of the filtering cavity 610. The positioning structure is disposed on the left side of the blocking plate 690 in contact with the blocking plate 690 to facilitate the positioning of the blocking plate 690 during installation, so that the blocking plate 690 can be easily positioned in place within filtering cavity 610. That is, the left side of the blocking plate 690 has enough space to install the main part of the filtering mechanism 620, and the filtered water outlet 6102 and the sewage outlet 6103 are located on the right side of the blocking plate 690.

In this embodiment, a raised limiting structure may also be provided on the inner wall of the filtering cavity 610, and the limiting structure is disposed on the right side of the blocking plate 690 to contact the blocking plate 690. Since the water flow tends to flow to the right in the filtering cavity 610, the setting of the limiting structure can prevent the blocking plate 690 from loosening and shifting to the right under the impact of the water flow, thus causing the sewage outlet 6103 to be directly connected to the space where the cleaning particles 680 are located.

In a further solution of this embodiment, the density of the cleaning particles 680 is smaller than that of water. After the water flow enters the filtering cavity 610, the cleaning particles 680 can float in the water, making it easier to be driven by the water flow in the first space of the filtering cavity 610, thereby causing friction and collision with the inner wall of the filtering cavity 610 and the outer wall of the filtering mechanism 620, causing the filtered impurities 501 to fall off. This avoids the situation where the cleaning particles 680 are deposited at the bottom of the filtering cavity 610 when the impact force of the water flow is insufficient, and the effective cleaning effect cannot be achieved.

In the preferred solution of this embodiment, the density of the cleaning particles 680 is 0.3 to 0.9 times the density of water, preferably 0.4 to 0.6 times, so that the cleaning particles 680 can quickly float from the bottom to the water surface, and then move with the water flow, which affects the filtering device 600 for internal cleaning.

In this embodiment, the water inlet 6101 is provided in the upper area of the filtering cavity 610. The water to be filtered enters the filtering cavity 610 from top to bottom, which has a greater impact on the filtering mechanism 620 and is easier to penetrate the filtering mechanism 620 for filtering. When cleaning the filtering device 600, the water flow entering the filtering cavity 610 through the water inlet 6101 can also wash the outer wall of the filtering mechanism 620 more powerfully, which has an auxiliary effect on peeling off the filtered impurities 501.

The diameter of the water inlet 6101 is smaller than the width d of the cleaning particles 680, and the cleaning particles 680 cannot pass through the water inlet 6101. In this way, the movement of the cleaning particles 680 is restricted between the water inlet 6101 and the blocking plate 690, which prevents the cleaning particles 680 from floating in the water and moving from the water inlet 6101 to the outside of the filtering cavity 610 when the filtering cavity 610 is filled with water.

In a further solution of this embodiment, the outer circumference of the filtered water outlet 6102 extends toward the outside of the filtering cavity 610 to form a sealing support part 611.

The filtering mechanism 620 includes:
a filtering part is located on the same side of the blocking plate 690 as the water inlet 6101, and filters the water entering the first space;
a water outlet joint 621, the left end of which is connected to the filtering part, the right end passes through the blocking plate 690, and is rotatably inserted into the sealing support part 611.

The blocking plate 690 is provided with a through hole 692 for the water outlet joint 621 to pass through, and the through hole 692 has a clearance fit with the outer wall of the water outlet joint 621.

In the above solution, the water outlet joint 621 is rotatably and sealingly connected to the sealing support part 611, and the filtered water flows out through the water outlet joint 621. The blocking plate 690 is provided with a through hole 692 that fits the outer wall of the water outlet joint 621 with a clearance. The outer wall of the water outlet joint 621 does not contact the inner wall of the through hole 692 to prevent friction between the blocking plate 690 and the water outlet joint 621 when the filtering mechanism 620 rotates, which affects the smooth rotation of the filtering mechanism 620.

In this embodiment, the directions of the water inlet 6101 and the sewage outlet 6103 are both perpendicular to the axial direction of the filtering mechanism 620.

Specifically, the filtering cavity 610 has a columnar structure, the filtered water outlet 6102 is disposed on the end face of the right end of the filtering cavity 610, the sewage outlet 6103 is disposed close to the right end of the filtering cavity 610 where the filtered water outlet 6102 is located, and the water inlet 6101 is set relatively close to the left end of the filtering cavity 610.

In the above solution, the filtered water outlet 6102 and the sewage outlet 6103 need to be arranged on the same side of the blocking plate 690, and both are arranged in the right end area of the filtering cavity 610, while the water inlet 6101 is relatively close to the left end, which is more convenient for the installation of the blocking plate 690, and is also conducive to reserving a larger space on the left side of the blocking plate 690.

On the other hand, the water inlet 6101 is positioned as far away from the water outlet joint 621 as possible so that the area of the filter part can be fully utilized. The water inlet 6101 and the sewage outlet 6103 are arranged up and down, and are staggered in the axial direction of the filtering cavity 610, which is conducive to fully discharging the sewage after cleaning the filtering device 600 in the filtering cavity 610. At the same time, the water inlet 6101 and the sewage outlet 6103 are staggered to form an axial flow of water in the filtering cavity 610, which is also conducive to driving the cleaning particles 680 in the filtering cavity 610 to fully circulate within the axial range of the filtering cavity 610 to fully clean the filtered impurities 501 attached inside the filtering cavity 610.

This embodiment also provides a washing machine with the above filtering device 600, including:
a water tank 100;
a circulating filter pipeline, the water inlet end and the water outlet end of which are respectively connected with the water tank 100, and a filtering device 600 is provided on it.

Specifically, a circulation pump 400 is provided between the water inlet end of the circulation filtration pipeline and the water inlet 6101 of the filtering device 600. When the circulation pump 400 is turned on, the water in the water tank 100 can be pumped into the circulation filtration pipeline, along the circulating filtering pipeline flows and is filtered through the filtering device 600, and the filtered water returns to the water tank 100. During the washing/rinsing process of the washing machine, the circulation pump 400 drives the water in the water tank 100 to continuously pass through the filtering device 600, which can reduce the lint content in the water in the water tank 100 and improve the washing effect.

In this embodiment, the filtering device 600 is installed transversely in the washing machine, that is, the axial direction of the filtering mechanism 620 is parallel to the horizontal direction.

In a further solution of this embodiment, a three-way structure is provided between the water outlet end of the circulation pump 400 and the water outlet end of circulation filter pipeline, and the three-way structure is connected to the external discharge pipeline 250 that drains water to the outside of the washing machine. The filtering device 600 is disposed between the three-way structure and the water outlet end of the circulating filter pipeline.

Further, the three-way structure is a switching device 270 that controls one of the filtering device 600 and the discharge pipeline 250 to be connected to the water outlet of the circulation pump 400, including:

a water inlet is connected with the water outlet of the circulation pump 400;

a first water outlet is connected with the filtering device 600;

a second water outlet is connected with the external discharge pipeline 250;

the switching mechanism controls the first water outlet and the second water outlet to selectively communicate with the water inlet.

Specifically, the circulating filter pipeline includes:

a water tank drainage pipe 260 connects the water tank 100 and the water inlet end of the circulation pump 400;

a drainage pipeline 210 has one end connected to the water outlet end of the circulation pump 400 and the other end connected to the water inlet of the switching device 270;

a circulation pipeline 220 has one end connected to the first water outlet of the switching device 270 and the other end connected to the water inlet 6101 of the filtering device 600;

a return water pipeline 230, one end of which is connected to the filtered water outlet 6102 of the filtering device 600, and the other end is connected to the water tank 100 to transport the filtered water to the water tank 100.

The water inlet end of the external discharge pipeline 250 is connected to the second water outlet of the switching device 270, and the water outlet end extends to the outside of the washing machine.

In detail, the filtering device 600 is arranged above the water tank 100, the circulation pipeline 220 and the return water pipeline 230 are also arranged above the water tank 100, and the water outlet end of the return water pipeline 230 is connected to the window gasket 110, thereby realizing the connection with the water tank 100. The circulation pump 400 is arranged below the water tank 100 and is connected to the water tank 100 through the water tank drainage pipe 260. Under the action of the circulation pump 400, the water in the water tank 100 is pumped out and transported from bottom to top along the drainage pipe 210 to the switching device 270.

Figure 5:
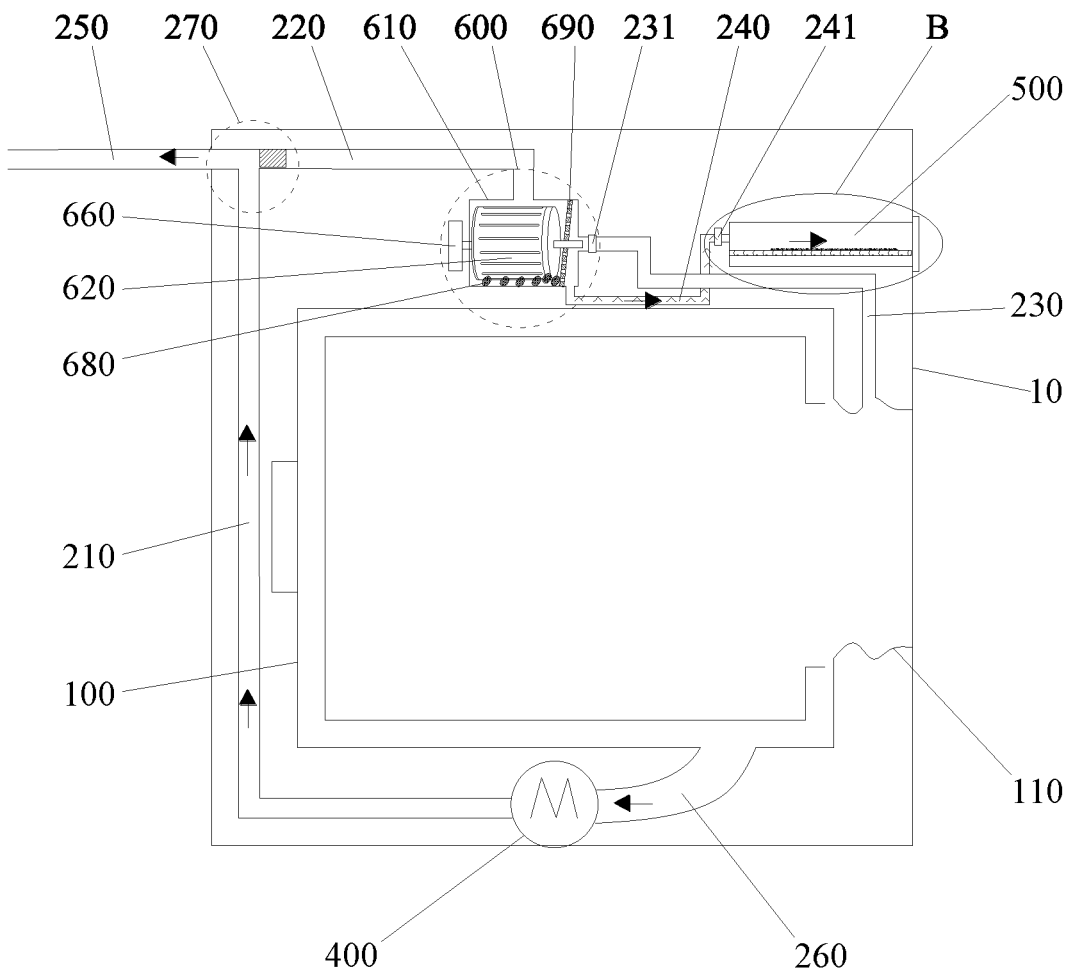
FIG. 5 is a schematic diagram of a washing machine performing a sewage discharge operation in Embodiment 1 of the present invention.

In the above scheme, through the arrangement of the switching device 270, both the filtering device 600 and the discharge pipeline 250 are selectively connected to the circulation pump 400. As shown in FIG. 1, at this time, the switching mechanism connects the water inlet and the first water outlet, that is, the circulation pump 400 is connected to the filtering device 600. Under the action of the circulation pump 400, the water in the water tank 100 flows along the circulation filter pipeline. The flow is filtered through the filtering device 600. As shown in FIG. 5, at this time, the switching mechanism connects the water inlet and the second water outlet, that is, the circulation pump 400 is connected to the discharge pipeline 250. Under the action of the circulation pump 400, the washing water in the water tank 100 is extracted passes through drain pipe 260, then passes through the drainage pipeline 210, and is finally sent to the discharge pipeline 250 to discharge the washing machine.

Under the above setting method, there is no need to set up two independent water channels inside the washing machine for circulation, filtration and discharge of wash water. At the same time, there is no need to set up a drainage pump and a circulation pump respectively. The switching device 270 is only used to change the relationship between the pipelines. With the connection method, the same circulation pump 400 can realize the two functions of external drainage and circulating filtered wash water. This simplifies the pipeline connection structure inside the washing machine and saves the space occupied by the pipeline. At the same time, only one circulation pump 400 can also reduce production costs.

In this embodiment, a water return port can also be provided on the wall of the water tank, and the outlet end of the return water pipeline is connected to the water return port to directly return water to the water tank.

The washing machine of this embodiment also includes a main water inlet pipeline for connecting an external water source and a water tank. The outlet end of the return water pipeline can also be connected to the main water inlet pipeline, for example, connected to a washing machine provided on the main water inlet pipeline. On the detergent box, the filtered water returns to the water tank through the detergent box.

In a further solution of this embodiment, the washing machine further includes a recovery device 500, which is connected to the sewage outlet 6103 and is used to collect discharged filtered impurities 501.

In the above solution, the recovery device 500 is provided to collect the filtered impurities 501 discharged from the filtering device 600, so that the filtered impurities 501 will not enter the drainage water flow and be discharged from the washing machine along with the drainage water flow. Through the above method, the fine thread debris in the filter impurity 501 is prevented from being discharged with the water flow and entering the ecological cycle, thereby causing harm to the ecological environment and human health.

In the preferred solution of this embodiment, the sewage outlet 6103 and the recovery device 500 are connected through the sewage pipeline 240, and the sewage pipeline 240 is provided with a sewage control valve 241 for controlling the opening and closing of the sewage pipeline 240.

At the same time, a return water control valve 231 is also provided on the return water pipeline 230 for controlling the opening and closing of the return water pipeline 230, thereby controlling the opening and closing of the circulating filtration pipeline.

In the above scheme, when the washing water in the water tank 100 is circulated and filtered, the return water control valve 231 is opened to conduct the return water pipeline 230, and the sewage control valve 241 is closed to cut off the sewage pipeline 240. Under the action of the circulation pump 400, the washing water passes through the water tank drainage pipe 260, the drainage pipeline 210, the circulation pipeline 220, the filtering device 600 in sequence, and finally returns to the water tank 100 through the return water pipeline 230. When it is necessary to discharge the filtered impurities 501 remaining in the filtering device 600, the return water control valve 231 is closed to cut off the return water pipeline 230, so that the washing water cannot flow out from the filtered water outlet 6102. At the same time, the sewage control valve 241 is opened to connect the sewage pipeline 240, and the sewage discharge pipeline 240 can be connected. It is ensured that all the water entering the filtering device 600 flows out from the sewage outlet 6103, and the filtered impurities 501 are fully taken out of the filtering device 600.

In the specific solution of this embodiment, the recovery device 500 includes:

a housing 510 has a recovery chamber inside;

a filter component 520 is disposed in the recovery chamber and divides the recovery chamber into a first chamber 531 and a second chamber 532.

The sewage outlet 6103 is connected to the first chamber 531. The sewage carrying filtered impurities 501 enters the first chamber 531, is filtered by the filter component 520, and then enters the second chamber 532. The filtered impurities 501 are collected in the first chamber 531.

Specifically, the filter component 520 can be a frame horizontally arranged at a certain height in the recovery chamber and a filter screen laid on the frame. After the sewage carrying filtered impurities 501 enters the first chamber 531, the water can enter the second chamber 532 through the filter component 520. The filtered impurities 501 are blocked by the filter screen and remain on the upper surface of the filter component 520.

In the above solution, a filter component 520 is provided in the recovery device 500 to filter the received sewage and separate the filtered impurities 501 therein from the water. The interior of the recovery device 500 is divided into a first chamber 531 and a second chamber 532 through the filter component 520. The filtered impurities 501 in the sewage are blocked by the filter component 520, thereby collecting the filtered impurities 501 on the upper surface of the filter component 520 in the first chamber 531, the filtered clean water is collected in the second chamber 532. Users can directly collect and process the separated filtered impurities 501, avoiding the situation where the filtered impurities 501 are dispersed in water and are difficult to process.

In this embodiment, the washing machine further includes a box body 10 in which the water tank 100 and the filtering device 600 are disposed. The housing 510 can be inserted/ extracted from the box body 10, and the user can pull the housing 510 out of the box body 10 to clean the inside.

Specifically, the upper side of the housing 510 has an opening. When the user pulls the housing 510 out of the box body 10, the filtered impurities 501 attached to the upper surface of the filter component 520 can be cleaned through the opening on the upper side of the housing 510. The filter component 520 is preferably detachably connected to the housing 510. The user can detach the filter component 520 from the inside of the housing 510 and take it out for cleaning, which makes the operation more convenient.

In a preferred solution of this embodiment, a water outlet is provided on the second chamber 532 for discharging filtered clean water. By arranging a water outlet in the second chamber 532, the clean water entering the second chamber 532 can be discharged from the recovery device 500 in a timely manner, thus preventing the recovery device 500 from overflowing when the amount of sewage discharged from the filtering device 600 is large. Otherwise, the capacity of the second chamber 532 needs to be increased, that is, the overall volume of the recovery device 500 needs to be increased, causing it to occupy a larger space inside the washing machine, which is not conducive to miniaturization of the overall volume of the washing machine.

On the other hand, the water in the second chamber 532 can be automatically discharged from the water outlet. When the user cleans the recovery device 500, he only needs to clean the filtered impurities 501 on the filter component 520 without manually pouring out clear water in the second chamber 532. When the filter component 520 is detachably installed in the housing 510, the user does not even need to completely remove the housing 510 from the washing machine box body 10, but only needs to take out the filter component 520 for cleaning, which is more convenient to operate.

During the washing process, the washing machine of this embodiment performs a circulation filtering operation, a self-cleaning operation, and a sewage discharge operation respectively.

Figure 2:
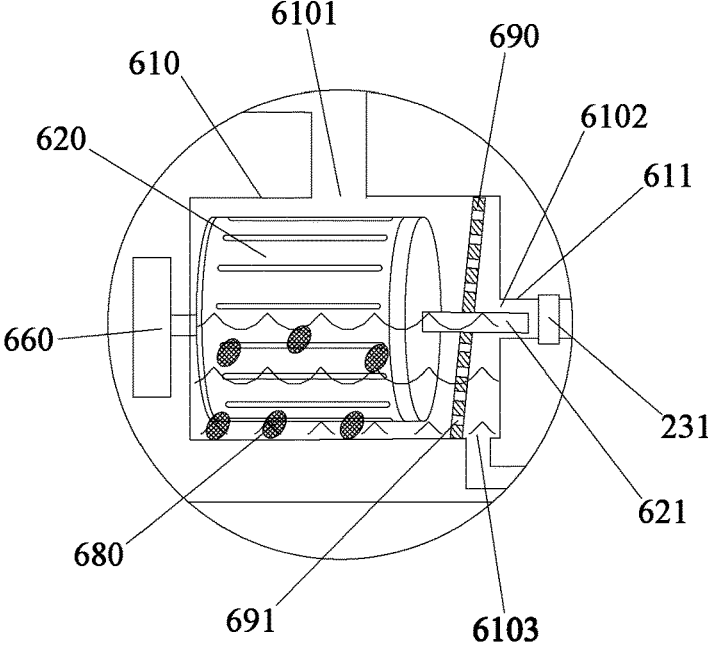
FIG. 2 is an enlarged schematic diagram of position A in FIG. 1 of the present invention.
Figure 3:
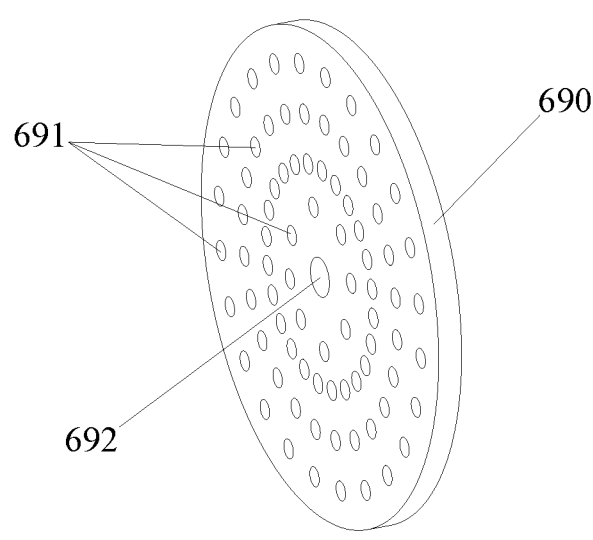
FIG. 3 is a schematic structural diagram of the blocking plate in Embodiment 1 of the present invention.

Specifically, as shown in FIGS. 1 and 2, the circulation filtering operation includes: the switching device 270 connects the drainage pipeline 210 and the circulation pipeline 220, the sewage control valve 241 is closed, and the return water control valve 231 is opened to conduct the return water pipeline 230; turn on the circulation pump 400, and introduce the water in the water tank 100 into the circulation filter pipeline. After filtering impurities are removed by the filtering device 600, it returns to the water tank 100 again. During the above process, the cleaning particles 680 move with the water flow in the filtering cavity 610 and continuously rub the inner wall of the filtering cavity 610 and the outer wall of the filtering mechanism 620 to prevent the deposition of filtered impurities.

Figure 4:
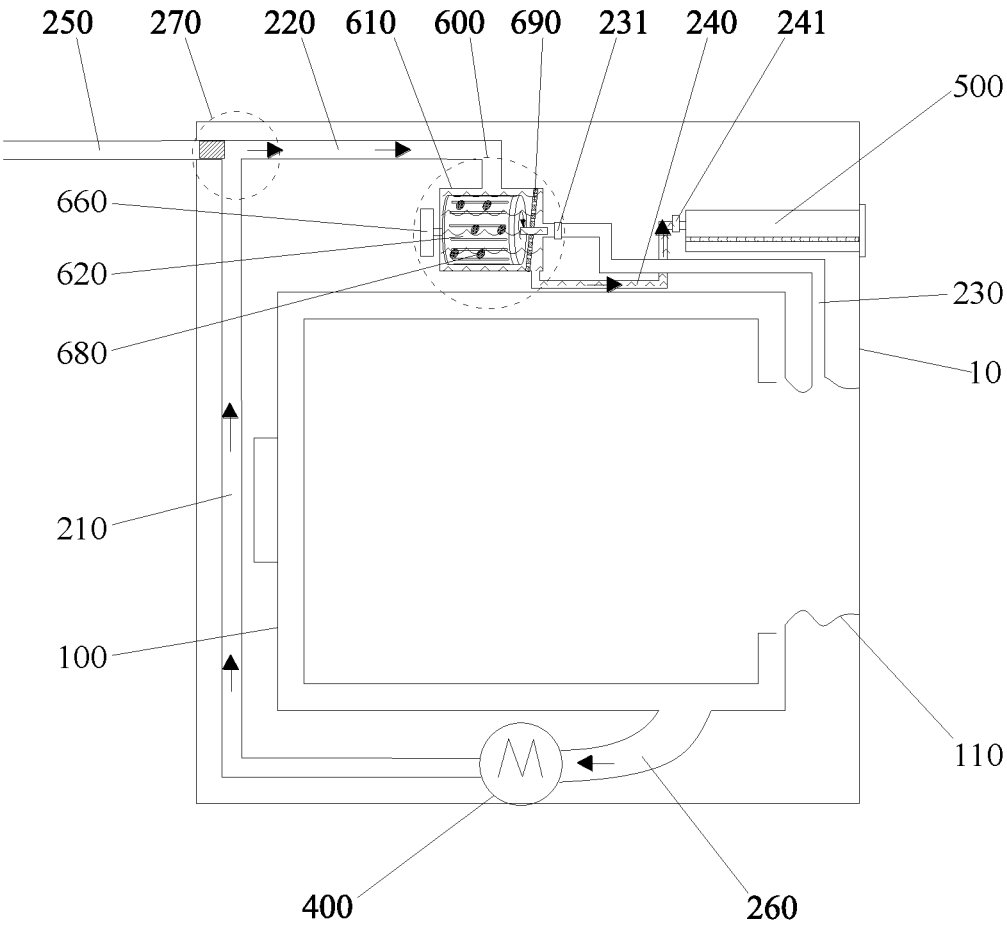
FIG. 4 is a schematic diagram of a washing machine performing a self-cleaning operation in Embodiment 1 of the present invention.

As shown in FIG. 4, the self-cleaning operation includes: closing the return water control valve 231, opening the sewage control valve 241 to conduct the sewage pipeline 240, starting the circulation pump 400, and introducing the water in the water tank 100 into the filtering device 600. After cleaning the filtering device 600, it is discharged into the recovery device 500. It also includes: controlling the driving mechanism 660 to drive the filtering mechanism 620 to rotate in the filtering cavity 610. During the above process, the cleaning particles 680 move with the water flow and rub against the inner wall of the filtering cavity 610 and the outer wall of the filtering mechanism 620 to assist in the removal of filtered impurities.

Figure 6:
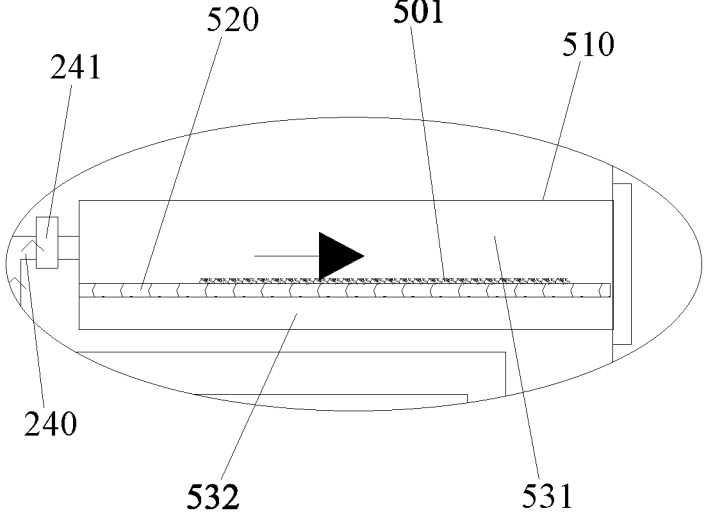
FIG. 6 is an enlarged schematic view of B in FIG. 5 of the present invention.

As shown in FIGS. 5 and 6, the sewage discharge operation includes: closing the return water control valve 231, opening the sewage control valve 241 to conduct the sewage pipeline 240, and discharging the sewage carrying filtered impurities 501 in the filtering device 600 into the recovery device 500. When performing the sewage discharge operation, the driving mechanism 660 can be controlled to be opened to drive the filtering mechanism 620 to rotate, or the driving mechanism 660 cannot be opened so that the filtering mechanism 620 remains stationary in the filtering cavity 610. During the above process, the discharge of sewage causes the water surface in the filtering cavity 610 to lower, and the cleaning particles 680 gradually sink as the water surface drops, and are blocked by the blocking plate 690, and are finally deposited at the bottom of the filtering cavity 610.

In this embodiment, the circulation filtering operation is performed in both the washing stage and one or more rinsing stages of the laundry process, and the self-cleaning operation and/or the sewage discharge operation is performed at least once in a complete laundry process. Preferably, the self-cleaning operation and the draining operation are performed at the end of the washing phase and each rinsing phase.

Specifically, the circulation pump 400 is turned on after a certain period of time after the water is introduced into the washing stage and each rinsing stage, and the circulation filtering operation is started. The circulation filtering operation continues until the washing or rinsing phase is almost completed. When drainage is about to begin, the return water control valve 231 is closed, the sewage control valve 241 is opened, and the driving mechanism 660 is started to perform a self-cleaning operation. After the self-cleaning operation continues for a certain period of time, the washing machine then performs the sewage discharge operation.

In detail, after the washing machine starts to receive water, the water level in the water tank 100 is detected.

When the water level reaches the preset water level, the circulation pump 400 is turned on to start performing the circulation filtering operation. This can prevent the amount of water in the water tank 100 from being too small and air being sucked into the circulation pump 400 to generate operating noise. While the washing machine performs the sewage discharge operation, it also controls the switching device 270 to connect the drainage pipeline 210 and the external discharge pipeline 250. The circulation pump 400 continues to run to discharge the remaining water in the water tank 100. The sewage discharge operation is performed at the same time as the washing machine's drainage operation, which is beneficial to improving the working efficiency of the washing machine.

In this embodiment, the washing machine is provided with a filtering device 600, which can circulate and filter the water in the water tank 100 during the operation of the washing machine, thereby reducing the content of lint in the water and improving the washing effect. The filtering device 600 can be self-cleaning to discharge the filtered impurities 501 remaining inside the filtering device 600 without requiring the user to remove the filtering device 600 from the washing machine for manual cleaning, which is convenient to use.

Cleaning particles 680 are provided in the filtering device 600 and can move with the water flow to prevent the deposition of filtered impurities 501 inside the filtering cavity 610, thereby improving the cleaning efficiency of the filtered impurities 501. A blocking plate 690 is provided in the filtering cavity 610 to separate the cleaning particles 680 from the filtered water outlet 6102 and the sewage outlet 6103 on both sides of the blocking plate 690. The blocking plate 690 has a water passage through which filtered impurities 501 such as water flow and lint can pass the water hole 691. The water in the filtering cavity 610 can pass through the water hole 691 on the blocking plate 690, and then be discharged from the filtering cavity 610 from the filtered water outlet 6102 or the sewage outlet 6103. However, the cleaning particles 680 are blocked by the blocking plate 690 and cannot pass through. It is discharged with the water flow from the filtered water outlet 6102 or the sewage outlet 6103, and it also avoids the accumulation of cleaning particles 680 at the filtered water outlet 6102 or the sewage outlet 6103 to cause blockage.

Embodiment 2

The difference between this embodiment and the above-mentioned Embodiment 1 is that the water passing structure is provided between the blocking plate and the inner wall of the filtering cavity.

Specifically, the outer peripheral part of the blocking plate is spaced apart from the inner wall of the filtering cavity, and the water passing structure is the gap between the blocking plate and the inner wall of the filtering cavity. The width of the gap is $D_2$, the width of the cleaning particles is d, and $D_2 < d$.

In detail, there is a gap with a width of $D_2$ between the lower edge of the blocking plate and the inner wall of the filtering cavity. The water flow and the lint debris it carries can pass through the gap and then be discharged from the sewage outlet on the filtering cavity. The size of the cleaning particles is larger than the width of the gap and cannot pass through. In turn, it can be blocked by the blocking plate and will not be discharged with the water flow from the filtered water outlet or sewage outlet, or it may accumulate at the filtered water outlet or sewage outlet and cause blockage, affecting the normal discharge of water flow.

Compared with the above-mentioned Embodiment 1, this embodiment only changes the structure of the blocking plate, and can also achieve effective blocking of cleaning particles, and has similar effects to those of Embodiment 1.

Embodiment 3

This embodiment provides a washing machine, which differs from the above-mentioned Embodiment 1 in that the filtering device is installed vertically in the washing machine, that is, the axial direction of the filtering mechanism is arranged vertically.

Specifically, the filtered water outlet on the filtering cavity is arranged vertically downward, and the water inlet and the sewage outlet are in opposite directions and both are parallel to the horizontal direction. Preferably, the water inlet is set higher than the sewage outlet, so that the filtered impurities remaining in the filtering device can be fully discharged, and the remaining filtered impurities can be prevented from breeding bacteria in the filtering device and contaminating the wash water. The blocking plate is arranged in the lower area of the filtering cavity. When the water in the filtering cavity is discharged, the cleaning particles are deposited on the upper surface of the blocking plate and will not be discharged with the water flow, nor will they block the filtered water outlet or sewage outlet.

In this embodiment, other structures and control methods of the washing machine are the same as those in the Embodiment 1, and have similar effects to those in the Embodiment 1.

Embodiment 4

Figure 7:
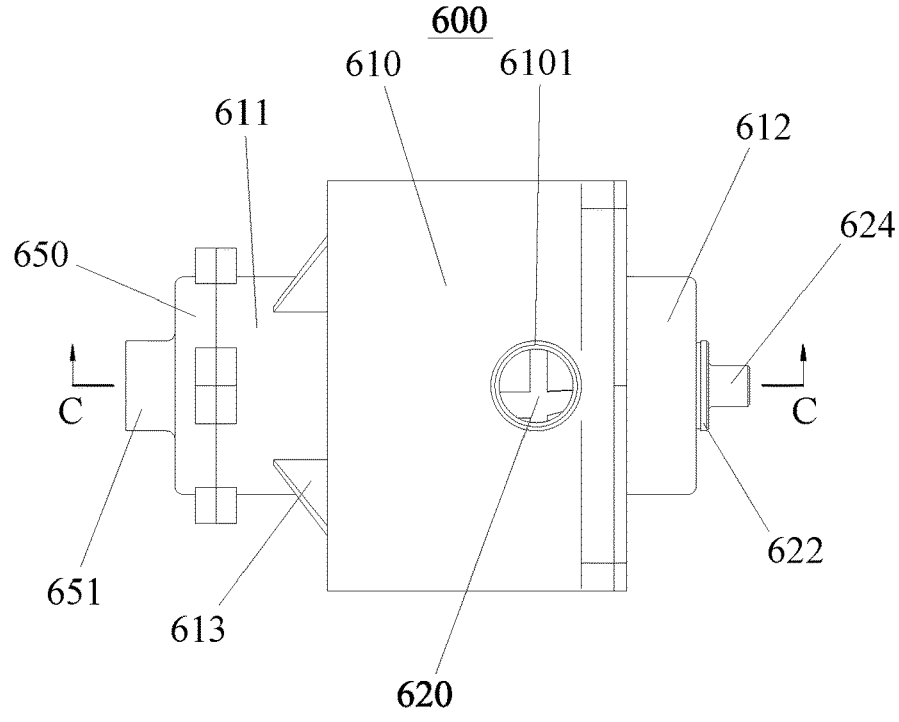
FIG. 7 is a schematic structural diagram of the filtering device in Embodiment 4 of the present invention.
Figure 8:
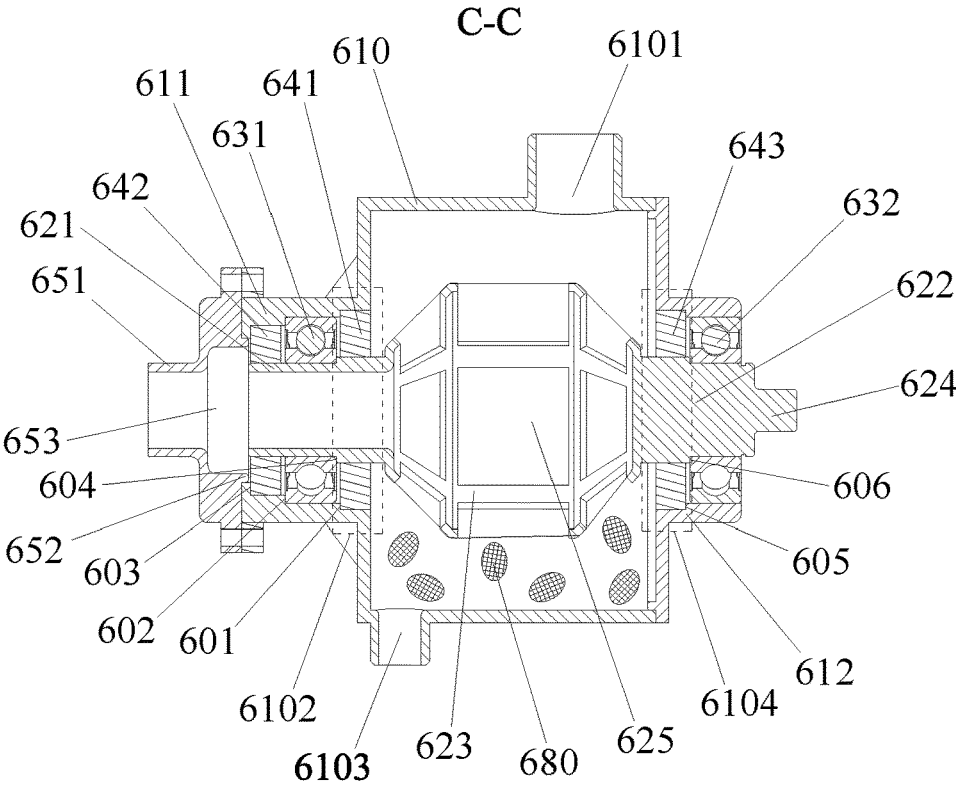
FIG. 8 is a schematic diagram of the CC section in FIG. 7 of the present invention.

As shown in FIGS. 7 and 8, this embodiment is a further limitation of the filtering device 600 (the blocking plate is not shown in the figure) in the Embodiment 1. The first bearing 631 is sleeved on the water outlet joint 621. A first seal 641 is provided on the side of the first bearing 631 facing the inside of the filtering cavity 610. The first seal 641 blocks the gap between the water outlet joint 621 and the sealing support part 611.

In the above solution, a first bearing 631 is provided between the water outlet joint 621 and the sealing support part 611 to support the water outlet joint 621, so that the water outlet joint 621 rotates more smoothly in the sealing support part 611, and at the same time, the structure is stable, which can ensure the filtering mechanism 620 rotates stably in the filtering cavity 610. A first seal 641 is provided on the right side of the first bearing 631 so that the washing water in the filtering cavity 610 cannot enter the gap between the water outlet joint 621 and the sealing support part 611, thus preventing the first bearing 631 from contacting water and avoiding the failure of the first bearing 631 which ensures the effect of the first bearing 631. At the same time, the first seal 641 also prevents unfiltered wash water from flowing out from the filtered water outlet 6102 through the sealing support part 611, thereby affecting the removal efficiency of the filtering device 600 in filtering impurities such as lint.

In the specific solution of this embodiment, the first seal 641 is sleeved on the water outlet joint 621, the inner wall of the first seal 641 is sealingly connected to the outer wall of the water outlet joint 621, and the outer wall of the first seal 641 is sealed connected to the inner wall of the sealing support part 611 rotatably.

In a further solution of this embodiment, the filtering device 600 also includes a second seal 642. The second seal 642 is disposed on the side of the first bearing 631 facing away from the inside of the filtering cavity 610, blocking the gap between the water outlet joint 621 and the sealing support part 611.

Specifically, the second seal 642 is sleeved on the water outlet joint 621, the inner wall of the second seal 642 is sealingly connected to the outer wall of the water outlet joint 621, and the outer wall of the second seal 642 is rotatably sealed connected with the inner wall of the sealing support part 611.

In the above solution, a second seal 642 is also provided on the left side of the first bearing 631. The water flowing out through the water outlet joint 621 can be blocked by the second seal 642 and will not contact the first bearing 631. The first bearing 631 is located between the first seal 641 and the second seal 642, which ensures that the installation environment of the first bearing 631 is water-free to the greatest extent, preventing the first bearing 631 from rusting when exposed to water and affecting the smoothness of the rotation of the filtering mechanism 620.

In a further solution of this embodiment, the inner wall of the sealing support part 611 has a stepped structure. From one end of the sealing support part 611 to the outside of the filtering cavity 610, a first limiting surface 601, a second limiting surface 601 and a third limiting surface 603 with an annular structure and gradually decreasing inner diameters are formed.

The surface of the first seal 641 facing the outside of the filtering cavity 610 is in contact with the first limiting surface 601. The surface of the first bearing 631 facing the outside of the filtering cavity 610 is in contact with the second limiting surface 602. The surface of the second seal 642 facing the outside of the filtering cavity 610 is in contact with the third limiting surface 603.

In the above solution, a plurality of vertical annular limiting surfaces are formed by the inner wall of the sealing support part 611 with a stepped structure, respectively abutting the left side surfaces of the first seal 641, the first bearing 631 and the second seal 642, which can limit the movement of the above three in the axial direction of the water outlet joint 621, and prevent the matching structure between the water outlet joint 621 and the sealing support part 611 from loosening during the rotation of the filtering mechanism 620.

In the preferred solution of this embodiment, the outer diameter of one end of the water outlet joint 621 close to the outside of the filtering cavity 610 is smaller than the outer diameter of the other end, and a fourth limiting surface 604 which has an annular structure is formed on the outer wall of the water outlet joint 621 and is perpendicular to the axis of the water outlet joint 621. The surface of the first bearing 631 facing the inside of the filtering cavity 610 is in contact with the fourth limiting surface 604.

By arranging the outer diameter of the left end of the water outlet joint 621 to be smaller than the right end, the fourth limiting surface 604 toward the left is formed at the sudden change in the outer diameter, and is in contact with the right surface of the first bearing 631. In this way, both sides of the first bearing 631 have limiting structures, making the structure more stable.

In this embodiment, one end of the sealing support part 611 away from the filtering cavity 610, that is, the left end of the sealing support part 611 is connected to the filtering cavity flange 650. The filtering cavity flange 650 has a through port 653 in the middle that communicates with the water outlet joint 621. The outer periphery of the through port 653 extends away from the sealing support part 611 to form a connection part 651.

Preferably, the surface of the filtering cavity flange 650 facing the sealing support part 611 has a raised insertion part 652, and the insertion part 652 is inserted into the opening at the left end of the sealing support part 611.

In the above solution, the left end of the sealing support part 611 is connected to the filtering cavity flange 650, and a connection part 651 is formed on the filtering cavity flange 650. The outer diameter of the connection part 651 is smaller than the outer diameter of the sealing support part 611, and preferably the inner diameter of the connection part 651 is equal to the inner diameter of the water outlet joint 621. When the filtering device 600 is installed in the washing machine, it is connected to the return water pipeline through the connection part 651. Compared with the method in which the return water pipeline is directly connected to the left end of the sealing support part 611, the installation is easier.

The right side of the filtering cavity flange 650 has an insertion part 652 inserted into the left end opening of the sealing support part 611 to facilitate positioning when the filtering cavity flange 650 and the sealing support part 611 are assembled. A number of fixing parts are respectively provided on the outer periphery of the filtering cavity flange 650 and the sealing support part 611, and screws are passed through the fixing parts to realize the fixation of the filtering cavity flange 650 and the sealing support part 611.

In a further solution of this embodiment, the outer wall of the sealing support part 611 is provided with reinforcing ribs 613 extending in the radial direction of the sealing support part 611, and the reinforcing ribs 613 are connected to the surface of the filtering cavity 610 where the filtered water outlet 6102 is located.

Since the sealing support part 611 extends to a certain length from the left end surface of the filtering cavity 610, the reinforcing ribs 613 are provided to support its peripheral side wall from the outside, ensuring the strength of the sealing support part 611.

In this embodiment, the filtering mechanism 620 includes a filter holder and a filter screen 625. The filter holder specifically includes:

a filter support part 623 is located inside the filtering cavity 610, the filter screen 625 covers the surface of the filter support part 623, the filter support part 623 and the filter screen 625 together constitute the filter part;

a water outlet joint 621 is provided at the left end of the filter support part 623, and is rotatably inserted into the sealing support part 611;

a rotating support part 622 is provided at the right end of the filter support part 623 and is rotatably connected to the filtering cavity 610.

In a further solution of this embodiment, the rotating support part 622 at the right end of the filtering mechanism 620 extends along its rotation axis toward the outside of the filtering cavity 610. The filtering cavity 610 is provided with an installation opening 6104 for the rotating support part 622 to pass through. The rotating support part 622 is rotatably and sealingly connected to the installation opening 6104.

The rotating support part 622 is used to connect the driving mechanism that drives the filtering mechanism 620 to rotate. The rotating support part 622 extends from the right end of the filtering cavity 610, and a motor mounting part 624 is provided at the right end of the rotating support part 622 for connecting with the driving mechanism. Therefore, the driving mechanism can be arranged outside the filtering cavity 610 to avoid contact with water.

Further, the outer periphery of the installation opening 6104 extends along the axis of the rotating support part 622 to form a sleeve part 612 out of the filtering cavity 610. The third seal 643 is sleeved on the rotating support part 622. The inner wall of the third seal 643 is sealingly connected to the outer wall of the rotating support part 622, and the outer wall of the third seal 643 is rotatably sealingly connected to the inner wall of the sleeve part 612.

A second bearing 632 is also provided between the sleeve part 612 and the rotating support part 622. The second bearing 632 is sleeved on the rotating support part 622 and is located on the side of the third seal 643 facing the outside of the filtering cavity 610.

In the above solution, the arrangement of the third seal 643 prevents the water in the filtering cavity 610 from leaking from the installation opening 6104, and the arrangement of the second bearing 632 can support the rotating support part 622 to ensure that the relative rotation of the rotating support part 622 and the sleeve part 612 is smoother. The second bearing 632 is disposed on the right side of the third seal 643 and is not in contact with the water in the filtering cavity 610 to avoid failure.

In the preferred solution of this embodiment, the inner diameter of one end of the sleeve part 612 close to the outside of the filtering cavity 610 is smaller than the inner diameter of the other end, and a fifth limiting surface 605 which has an annular structure is formed on the inner wall of the sleeve part 612 and is perpendicular to the axis of the rotating support part 622. The surface of the third seal 643 facing the outside of the filtering cavity 610 is in contact with the fifth limiting surface 605.

The outer diameter of one end of the rotating support part 622 close to the outside of the filtering cavity 610 is smaller than the outer diameter of the other end. A sixth limiting surface with an annular structure and perpendicular to the axis of the rotating support part 622 is formed on the outer wall of the rotating support part 622 606. The surface of the second bearing 632 facing the inside of the filtering cavity 610 is in contact with the sixth limiting surface 606.

In the above solution, the inner diameter of the right end of the sleeve part 612 is smaller than the inner diameter of the left end, and the fifth limiting surface 605 toward the left is formed at a sudden change in the inner diameter to contact the right surface of the third seal 643. The outer diameter of the right end of the rotating support part 622 is smaller than the outer diameter of the left end, and a sudden change in the outer diameter forms a sixth limiting surface 606 toward the right, which contacts the left surface of the second bearing 632. The above structure limits the movement of the third seal 643 and the second bearing 632 in the axial direction of the rotating support part 622, and the structure is stable.

Furthermore, the cross-sectional area of the middle region of the filter support part 623 is constant, and its left and right ends have tapered structures, so that the partial surface of the filter screen 625 is tilted, which is beneficial to the shedding of attached lint.

In this embodiment, the first bearing 631 and the second bearing 632 are respectively provided at both ends of the filtering mechanism 620 for support, ensuring that the filtering mechanism 620 rotates smoothly and stably in the filtering cavity 610. At the same time, through the arrangement of the first seal 641, the second seal 642 and the third seal 643, the installation environment of the first bearing 631 and the second bearing 632 is guaranteed to be water-free to the greatest extent, preventing the first bearing 631 and the second bearing 632 from being in contact with water to avoid failure of both.

Embodiment 5

As shown in FIGS. 1 and 2, this embodiment provides a control method for the washing machine described in the first embodiment, which is used to fully discharge the sewage in the filtering device 600.

Specifically, the control method includes:

turning on the circulation pump 400, communicating the circulation filter pipeline, and the washing machine performs circulation filtering and rinsing;

after rinsing is completed, the circulation pump 400 being turned off;

turning on the driving mechanism 660 to drive the filtering mechanism 620 to rotate in the filtering cavity 610;

when the first setting condition is reached, the circulation pump 400 is turned on, and the sewage control valve 241 is opened to communicate the sewage pipeline 240;

when the second setting condition is reached, cut off the circulation filter pipeline.

Preferably, after the first setting condition is reached, the driving mechanism 660 remains open and drives the filtering mechanism 620 to continue rotating.

In this embodiment, the connection to the circulation filtration pipeline includes: the switching device 270 conducts the water outlet end of the filtration device 600 and the circulation pump 400, and opens the return water control valve 231 to conduct the return water pipeline 230. The said cutting off the circulation filtration pipeline includes: the switching device 270 conducts the discharge pipeline 250 and the water outlet end of the circulation pump 400.

It can be understood that the above-mentioned cutting off the circulation filtration pipeline can also be achieved by shutting down the circulation pump 400.

In the above solution, the washing machine performs circulation filtration of the rinsing water during the rinsing process, and the filtering device 600 and the circulating filtration pipeline are always filled with rinsing water.

After rinsing is completed and the circulation pump 400 is turned off, the water in the drainage pipeline 210 and the circulation pipeline 220 will flow back downwards under the action of gravity, and can flow back up to the level of the water surface in the drainage pipeline 210 and the water level in the water tank 100. The pipeline between the above and the filtering device 600 is filled with air. However, the filtering device 600 is lower than the circulation pipe 220, and the water therein will not flow back through the circulation pipe 220. When the circulation pump 400 is closed, the return water control valve 231 is also closed, and the drain control valve 241 is in a closed state at this time. The water inside the filtering device 600 remains in the filtering cavity 610 and will not be discharged outward.

After the driving mechanism 660 is turned on, it drives the filtering mechanism 620 to rotate at a high speed, so that the filtered impurities such as lint and other particles attached to the surface are peeled off from the surface of the filtering mechanism 620 under the action of centrifugal force. At this time, since the return water control valve 231 and the sewage control valve 241 are both closed, the water in the filtering cavity 610 does not flow out. The high-speed rotating filtering mechanism 620 can also stir the water flow in the filtering cavity 610, forming a turbulent water flow. It causes a certain impact force on the surface of the filtering mechanism 620, and also drives the cleaning particles 680 to move to frictionally collide with the inner wall of the filtering cavity 610 and the outer wall of the filtering mechanism 620, further enhancing the shedding of wire debris. Filtered impurities such as lint scraps peeled off from the surface of the filtering mechanism 620 are integrated into the water in the filtering cavity 610.

When the circulation pump 400 is turned on, the sewage control valve 241 is also opened to connect the sewage pipeline 240. The sewage in the filtering device 600 can be discharged from the sewage outlet 6103. The cleaning particles 680 are blocked by the blocking plate 690 and remain inside the filtering cavity 610. The opening of the circulation pump 400 presses the air in the drainage pipeline 210 and the circulation pipeline 220 into the filtering device 600, so that the sewage carrying lint in the filtering device 600 is completely discharged from the sewage outlet 6103 under the air pressure, preventing the filtering device 600 from sewage residue in the filter, which has a good cleaning effect on the filtering device 600. The sewage control valve 241 is opened when the circulation pump 400 is turned on, ensuring the pressure generated when air passes into the filtering device 600, thereby ensuring that the sewage in the filtering device 600 is fully discharged.

In order to prevent the water in the water tank 100 from entering the filtering device 600 through the circulation pipeline 220 after the sewage in the filtering device 600 is drained, the washing machine is preset with a second setting condition. When the second setting condition is reached, the circulation is cut off. The filter pipeline stops the water in the water tank 100 from being transported to the filtering device 600.

In a specific solution of this embodiment, the first setting condition may be that the circulation pump 400 is turned off for the first set time $t_1$, and the second set condition may be that the circulation pump 400 is turned on for the second set time $t_2$.

In the above solution, the specific values of the first set time $t_1$ and the second set time $t_2$ can be obtained in advance through a large number of experiments and directly written into the control program of the washing machine.

Specifically, the value of the first set time $t_1$ is approximately the maximum time required for the water level in the drainage pipeline 210 to begin to decrease until it stops, and the value of the second set time $t_2$ is approximately the shortest time required for the water level in the drainage pipeline 210 to rise to close to the top of the drainage pipeline 210 after the circulation pump 400 is turned on. In this way, it can be ensured that a larger amount of air can enter the pipeline when the circulation pump 400 is turned off, and at the same time, it can effectively prevent water from entering the filtering device 600 after the circulation pump 400 is turned on.

In another solution of this embodiment, the water level height can also be used as the first setting condition and the second setting condition. Specifically, the first setting condition is: the water level in the pipeline between the circulation pump 400 and the filtering device 600 reaches the first setting value $H_1$. The second setting condition is: the water level in the pipeline between the circulation pump 400 and the filtering device 600 reaches the second setting value $H_2$. Among them, $H_1 < H_2$.

In this embodiment, the above-mentioned water level is specifically the water level height in the drainage pipeline 210. A water level detection device may be provided in the drainage pipeline 210 of the washing machine to detect the water level in the drainage pipeline 210.

In the above solution, the value of the first set value $H_1$ is greater than and as close as possible to the highest water level of the washing machine to ensure that after the circulation pump 400 is turned off, the water level in the drainage pipe 210 can drop to the first set value $H_1$.

When the washing machine receives a signal that the water level in the drainage pipe 210 rises to the second set value $H_2$ and when the switching device 270 turns on the drainage pipe 210 and the external discharge pipe 250. In order to avoid response delay causing water to enter the filtering device 600 after the circulation pump 400 is turned on, there needs to be a certain difference $\Delta H$ between the value of the second set value $H_2$ and the water level corresponding to the top of the drainage pipe 210. The specific value of the difference $\Delta H$ can be obtained through a large number of experiments conducted in advance, thereby ensuring that after the washing machine receives the signal that the water level reaches the second set value $H_2$. it has sufficient response time to control the switching device 270 to complete the switch of the water path.

In a further solution of this embodiment, the washing machine determines that the current operation process is the last rinsing stage in this laundry program, then turns off the circulation pump 400 after the rinse is completed, and turns on the circulation pump 400 after reaching the first setting condition.

The washing machine determines that the current running process is not the last rinsing stage in this laundry program, and then performs the following operations after rinsing is completed:

the circulation pump 400 remains in operation;

when the third setting condition is reached, cut off the circulation filter pipeline.

In the above solution, for the intermediate rinsing stage, since the washing machine needs to continue to operate, that is, the rinsing water will circulate through the filtering device 600 for filtration. At this time, the sewage carrying lint in the filtering device 600 does not need to be drained. It is necessary to remove the lint attached to the surface of the filtering mechanism 620.

After rinsing is completed, the return water control valve 231 is closed, the sewage control valve 241 is opened, the circulation pump 400 remains in operation, and the water in the water tank 100 continues to be transported to the filtering device 600 under the action of the circulation pump 400, affecting the inside of the filtering device 600. Flushing is performed, and the flushed sewage is discharged into the sewage pipeline 240 through the sewage outlet 6103.

In this embodiment, the third setting condition may be the end of rinsing and the third preset time $t_3$, whose value is obtained through experiments in advance and written into the control program to ensure that the lint attached to the surface of the filtering mechanism 620 can be basically removed.

Alternatively, the circulation filtration pipeline can also be cut off when the water level in the water tank 100 drops to the preset value $\Delta H_1$, that is, the switching device 270 is controlled to connect the drainage pipeline 210 and the external discharge pipe 250, and the circulation pump 400 continues to operate. The remaining water in the water tank 100 is drained out of the washing machine.

In the preferred solution of this embodiment, after the intermediate rinsing is completed, the driving mechanism 660 is turned on to drive the filtering mechanism 620 to rotate at a high speed in the filtering cavity 610, which can stir the water in the filtering cavity 610 and cause the attached lint to be stirred by centrifugal force and agitation.

Under the dual action of the water flow, it is peeled off from the surface of the filtering mechanism 620, blends into the water in the filtering cavity 610, and is then discharged from the filtering cavity 610 through the sewage outlet 6103. The cleaning efficiency of the lint debris is high.

In this embodiment, the washing machine only performs the operation of first turning off the circulation pump 400 and then turning on the circulation pump 400 at the end of the last rinse, so as to completely drain the sewage in the filtering device 600. At the end of the intermediate rinsing, the circulation pump 400 remains in operation, which prevents the circulation pump 400 from being frequently turned on and off during the operation of the washing machine, which affects its service life.

In this embodiment, the washing machine also cleans the filtering device 600 after washing. The specific control method is as follows:

the circulation pump 400 is turned on, the switching device 270 connects the water outlet of the circulation pump 400 and the filtering device 600, the return water control valve 231 is opened, and the washing machine performs circulation filtering and washing;

after washing is completed, the circulation pump 400 remains running, the return water control valve 231 is closed, and the sewage control valve 241 is opened;

when the fourth setting condition is reached, the switching device 270 connects the water outlet end of the circulation pump 400 and the discharge pipe 250.

The fourth setting condition may be that the washing is completed and the fourth preset time $t_4$ is reached, or that the water level in the water tank 100 drops to a preset value $\Delta H_2$.

After the washing is completed, circulation filter rinsing needs to be performed in the subsequent process of the laundry process. Similar to the intermediate rinsing, the sewage in the filtering device 600 does not need to be completely discharged. The circulation pump 400 can remain running and does not need to be shut down.

In this embodiment, after the washing and intermediate rinsing are completed, the washing machine controls the circulation pump 400 to keep running, and transports the water in the water tank 100 to the filtering device 600 for flushing. The flushed sewage is discharged from the sewage outlet 6103 of the filtering device 600. After the last rinse, first turn off the circulation pump 400, wait for air to enter the pipeline, and then restart the circulation pump 400 to press the air in the pipeline into the filtering device 600, thereby completely draining the sewage and ensuring that the washing machine stops running. There is no sewage residue in the post-filtration device 600, which can effectively prevent bacterial growth. At the same time, the washing machine only performs the operation of first turning off the circulation pump 400 and then turning it on after the last rinse, which reduces unnecessary opening and closing operations of the circulation pump 400 and extends the service life of the circulation pump 400.

The above are only preferred embodiments of the present invention, and do not limit the present invention in any form. Although the present invention has been disclosed above in preferred embodiments, it is not intended to limit the present invention. Anyone familiar with the technology of this patent Without departing from the scope of the technical solution of the present invention, personnel can make some changes or modify the above-mentioned technical contents into equivalent embodiments with equivalent changes. In essence, any simple modifications, equivalent changes and modifications made to the above embodiments still fall within the scope of the present invention.

The invention claimed is:

1. A filtering device, including:
a filtering cavity being provided with a water inlet, a filtered water outlet and a sewage outlet for discharging filtered impurities;
a filtering mechanism being rotatably installed inside the filtering cavity to filter water entering the filtering cavity;
wherein, the filtering device further includes:
a blocking mechanism, which includes a blocking plate arranged inside the filtering cavity, and a first space and a second space are respectively formed on both sides of the blocking plate, the water inlet is communicated to the first space, and the filtered water outlet and sewage outlet are communicated to the second space;
a water passing structure is provided on the blocking plate or between the blocking plate and the inner wall of the filtering cavity for communicating the first space and the second space;
cleaning particles arranged in the first space of the filtering cavity are used to clean an inner wall of the filtering cavity and an outer wall of the filtering mechanism with friction and collision along with water flow;
wherein the water inlet and the cleaning particles are provided on a side of the blocking plate, and the filtered water outlet and the sewage outlet are provided on an other side of the blocking plate;
wherein an outer circumference of the filtered water outlet extends toward an outside of the filtering cavity to form a sealing support part; and
wherein the filtering mechanism includes:
a filtering part, being provided on the same side of the blocking plate as the water inlet and filters the water entering the first space;
a water outlet joint, one end of which is connected to the filtering part, an other end passes through the blocking plate, and is rotatably inserted into the sealing support part.

2. The filtering device according to claim 1, wherein, the water passing structure is a plurality of water holes provided on the blocking plate; a width of the water holes is $D_1$, and a width of the cleaning particles is d, and $D_1 < d$;

alternatively, an outer peripheral part of the blocking plate is spaced apart from the inner wall of the filtering cavity, and the water passing structure is a gap between the blocking plate and the inner wall of the filtering cavity; a width of the gap is $D_2$, and the width of the cleaning particles is d, and $D_2 < d$.

3. The filtering device according to claim 2, wherein a density of the cleaning particles is less than that of water.

4. The filtering device according to claim 3, wherein, the density of the cleaning particles is 0.3 to 0.9 times the density of water, preferably 0.4 to 0.6 times.

5. The filtering device according to claim 3, wherein, the water inlet is provided in an upper area of the filtering cavity, and a diameter of the water inlet is smaller than the width d of the cleaning particles.

6. The filtering device according to claim 1, wherein the blocking plate is provided with a through hole for the water outlet joint to pass through, and the through hole fits with an outer wall of the water outlet joint with a clearance.

7. The filtering device according to claim 6, wherein, directions of the water inlet and the sewage outlet are perpendicular to an axial direction of the filtering mechanism.

8. The filtering device according to claim 1, wherein, directions of the water inlet and the sewage outlet are perpendicular to an axial direction of the filtering mechanism.

9. The filtering device according to claim 8, wherein, the filtering cavity has a columnar structure, the filtered water outlet is disposed on an end surface of one end of the filtering cavity, the sewage outlet is disposed near one end of the filtered water outlet, and the water inlet is disposed near an other end of the filtering cavity.

10. The filtering device according to claim 1, wherein, a bearing is set on the water outlet joint; a seal is provided on a side of the bearing facing the inside of the filtering cavity, and the seal blocks a gap between the water outlet joint and the sealing support part.

11. A washing machine, wherein the washing machine includes:

a water tank;

a circulating filter pipeline, a water inlet end and a water outlet end of the circulating filter pipeline are respectively connected with the water tank, and the filtering device according to claim 1 is arranged on the circulating filter pipeline.

12. The washing machine according to claim 11, further comprising a recovery device connected to the sewage outlet for collecting the filtered impurities discharged.

13. The washing machine according to claim 12, wherein the recovery device includes:

a housing, being provided with a recovery chamber inside;

a filter component, being arranged in the recovery chamber and divides the recovery chamber into a first chamber and a second chamber;

the sewage outlet is communicated to the first chamber, and sewage carrying the filtered impurities enters the first chamber, and enters the second chamber after being filtered by the filter component, and the filtered impurities are collected in the first chamber;

the second chamber is provided with a water outlet for discharging filtered clean water;

the washing machine further includes a box body, the water tank and the filtering device are both disposed in the box body; the housing is insertable/extractable and is disposed on the box body.

14. The washing machine according to claim 12, the sewage outlet and the recovery device are connected through a sewage pipeline, and a sewage control valve for controlling opening and closing of the sewage pipeline is provided on the sewage pipeline.

\* \* \* \* \*